(12) United States Patent
Gowans

(10) Patent No.: US 9,132,763 B2
(45) Date of Patent: Sep. 15, 2015

(54) LOADING AND UNLOADING SYSTEM FOR A VEHICLE

(71) Applicant: Garry Alexander Gowans, Ontario (CA)

(72) Inventor: Garry Alexander Gowans, Ontario (CA)

( * ) Notice: Subject to any disclaimer, the term of this patent is extended or adjusted under 35 U.S.C. 154(b) by 42 days.

(21) Appl. No.: 13/950,597

(22) Filed: Jul. 25, 2013

(65) Prior Publication Data

US 2014/0044513 A1 Feb. 13, 2014

(30) Foreign Application Priority Data

Jul. 27, 2012 (CA) ..................................... 2783925

(51) Int. Cl.
*B60P 1/02* (2006.01)
*B60P 3/077* (2006.01)
*B65G 67/02* (2006.01)
*B65G 67/54* (2006.01)

(52) U.S. Cl.
CPC . *B60P 1/02* (2013.01); *B60P 3/077* (2013.01); *B65G 67/02* (2013.01); *B65G 67/54* (2013.01)

(58) Field of Classification Search
CPC .......... B60P 1/02; B60P 3/077; B65G 67/02; B65G 67/54
USPC .............................. 414/541, 544; 296/3, 37.6
See application file for complete search history.

(56) References Cited

U.S. PATENT DOCUMENTS

| | | | | |
|---|---|---|---|---|
| 3,815,164 A * | 6/1974 | Smith | ................................ | 5/86.1 |
| 4,288,195 A * | 9/1981 | Brewer | ......................... | 414/608 |
| 4,690,609 A * | 9/1987 | Brown | ........................... | 414/543 |
| 5,180,275 A * | 1/1993 | Czech et al. | ................... | 414/541 |
| 5,326,212 A * | 7/1994 | Roberts | .......................... | 414/347 |
| 5,331,701 A * | 7/1994 | Chase et al. | ..................... | 14/71.1 |
| 5,346,355 A * | 9/1994 | Riemer | .......................... | 414/542 |
| 5,391,043 A * | 2/1995 | Bohata et al. | .................. | 414/544 |
| 5,395,201 A * | 3/1995 | Yamashita et al. | ............. | 414/467 |
| 5,403,145 A * | 4/1995 | Cradeur et al. | ............. | 414/745.3 |
| 5,662,453 A * | 9/1997 | Gerstner et al. | ............... | 414/812 |
| 6,024,528 A * | 2/2000 | Taylor | ........................... | 414/495 |
| 6,305,897 B1 * | 10/2001 | Budd et al. | ..................... | 414/540 |
| 6,345,693 B1 * | 2/2002 | Yeo et al. | ....................... | 187/211 |
| 6,726,435 B1 * | 4/2004 | Williams et al. | ............... | 414/542 |
| 7,033,128 B2 * | 4/2006 | Poindexter | ..................... | 414/544 |
| 7,568,877 B1 * | 8/2009 | Nespor | .......................... | 414/545 |
| 7,581,917 B1 * | 9/2009 | Depagter | ....................... | 414/462 |
| RE43,024 E * | 12/2011 | Parnes et al. | ................... | 414/544 |
| 8,186,739 B2 * | 5/2012 | Bruestle et al. | ........... | 296/100.02 |
| 8,464,846 B2 * | 6/2013 | Andersen et al. | ............... | 188/32 |
| 2010/0086389 A1 * | 4/2010 | Johnson et al. | ............... | 414/544 |
| 2010/0215468 A1 * | 8/2010 | Kollewe | ......................... | 414/544 |
| 2010/0329831 A1 * | 12/2010 | Tornese et al. | ................ | 414/544 |
| 2011/0010057 A1 * | 1/2011 | Kim | ................................ | 701/50 |

* cited by examiner

*Primary Examiner* — Saul Rodriguez
*Assistant Examiner* — Ashley Romano
(74) *Attorney, Agent, or Firm* — Ziegler IP Law Group, LLC.

(57) ABSTRACT

An loading and unloading system is described that allows a load to be loaded and unloaded to and from the bed of a vehicle on which the loading and unloading system is mounted. The loading and unloading system is affixed to a vehicle bed and includes an enclosure providing structural support for the lifting mechanism and shelter for cargo security and protection. The lifting mechanism, in conjunction with the enclosure structure, loads or unloads cargo that is secured to a lifting platform using vertical linear motion as well as horizontal linear motion.

15 Claims, 18 Drawing Sheets

US 9,132,763 B2

LOADING AND UNLOADING SYSTEM FOR A VEHICLE

TECHNICAL FIELD

The current application relates to a system for loading and unloading cargo, and in particular to loading and unloading systems mounted on a bed of a vehicle.

BACKGROUND

Loading and unloading cargo can require lifting heavy loads. Various systems for aiding in the loading and unloading of cargo from a bed of a vehicle have been devised. For example, in order to aid in loading and unloading of a motorcycle from a bed of a pickup truck, ramps have often been used. The motorcycle can be pushed or pulled up the ramps into the bed of the pickup truck and secured for transport.

Other attempted solutions for loading cargo such as a motorcycle onto a bed of a vehicle have included a platform, which the cargo is secured to, that is levered or pulled up a ramp into the bed. These attempts generally require that the cargo and platform are subjected to a very steep angle which may be undesirable. The steep angle may causes increased stress on components used to anchor the cargo to the platform as well as components of the cargo such as handlebars on a motorcycle.

Enclosures such as truck caps, cubes on a cube van, or the inherent enclosure of a van prevent the use of loading solutions due to the obstructive nature of the confined enclosure. Similarly, most attempted loading solutions prevent the use of such enclosures, or were not designed to be integrated with an enclosure.

A cargo loading and unloading system that can be mounted to a vehicle that overcomes at least one of the drawbacks of at least one of the previously attempted solutions, improves on at least one of the previously attempted solutions or provides additional benefits over at least one of the previously attempted solutions is desired.

BRIEF DESCRIPTION OF THE DRAWINGS

An enclosed system for loading and unloading cargo will be described with reference to the appended drawings, in which.

DETAILED DESCRIPTION

Figure 1:
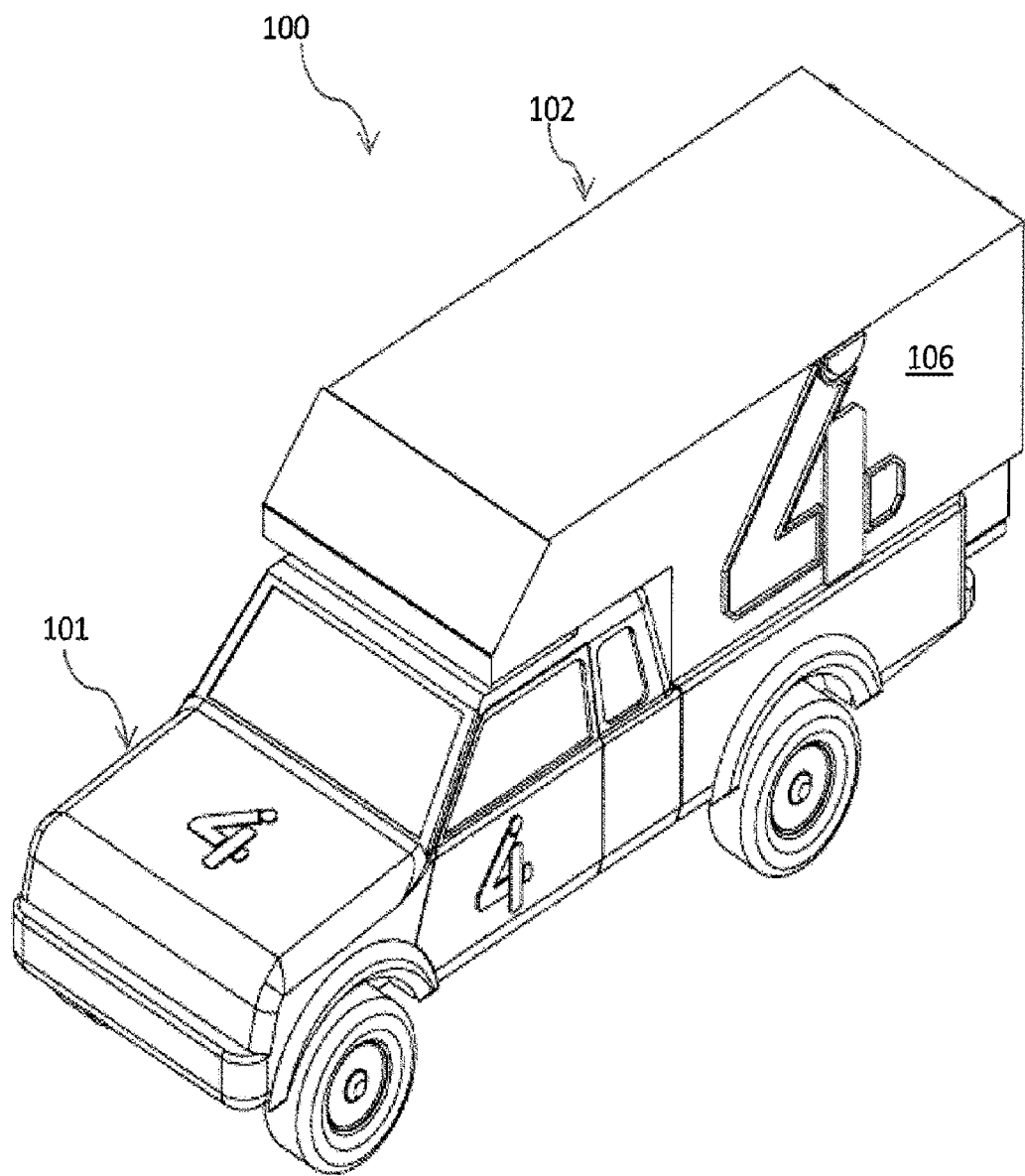
FIG. 1 is an isometric view of the enclosed lifting system mounted on a bed of a truck.

In accordance with the present disclosure there is provided a vehicle mounted loading and unloading system comprising a stationary frame; a horizontal movement assembly; a vertical movement assembly; and a cargo platform. The stationary frame comprises first and second side wall frames spaced apart from each other to define a cargo space, each side wall frame comprising at least one support surface for contacting a load-bearing surface of a vehicle when the loading and unloading system is mounted to the vehicle; and a horizontal support rail. The horizontal movement assembly comprises a sliding frame sized to fit between the first and second side wall frames; and a supporting assembly connected to the sliding frame, the supporting assembly contacting the horizontal support rail to support the sliding frame and allow horizontal movement of the sliding frame. The vertical movement assembly comprises a first member having a first end connected to the sliding frame of the horizontal movement assembly; and a second member slidably coupled to the first member and having a second end extendable away from and retractable towards the first end of the first member in a vertical direction. The cargo platform is connected to the second end of the second member.

In accordance with the present disclosure there is provided a wheel chock comprising: a frame for receiving a vehicle wheel, the frame having first and second sides connected together to capture the vehicle wheel; a locking mechanism for securing the vehicle wheel to the frame when in use, the locking mechanism comprising: a locking band having a first end coupled to the first side of the frame; and a locking arm connected to a second end of the locking band, the locking arm pivotally coupled to the second side of the frame and pivotable between an unlocked position, in which the locking band does not restrict the vehicle wheel and a locked position in which the locking band is drawn against the vehicle wheel to secure the vehicle wheel to the frame.

An enclosed vehicle mounted loading and unloading system is described that comprises a stationary frame supported by the vehicle that supports a horizontal movement assembly and a vertical movement assembly. A cargo platform is connected to the vertical lifting assembly. The cargo platform can be lowered down to ground level and cargo loaded onto it. The vertical movement assembly can raise the cargo platform and cargo, and once it is raised, the horizontal movement assembly can move the vertical movement assembly and the cargo platform with the cargo into the stationary frame for transport, or storage.

The lifting system described herein provides easy loading and unloading of heavy cargo into and out of a truck bed. The system described in detail herein as being mounted in the bed of a pickup truck. It is contemplated that the lifting system could be adapted to be used in other applications such as vans, trailers, and flatbeds. The lifting system is described as being integrated with an enclosure that provides protection for the cargo being transported. However, depending upon the desired application, the enclosure may be omitted in part or in its entirety. Further, the lifting system described herein remains mounted in the truck bed with the cargo while in transit.

Broadly, the lifting system described further herein comprises two main components. The first component is a stationary frame that is mounted to the bed of the pickup truck and defines an interior cargo space. The stationary frame may be skinned with metal, plastic or wood sheeting or otherwise enclosed to provide protection to the cargo being carried. If the stationary frame is enclosed, it can provide protection against the elements as well as provide protection against possible damage to cargo or theft of cargo. The second main component is a moveable assembly that is connected to the stationary frame and can be moved to allow cargo to be loaded into and out of the cargo space. As described further herein, the moveable assembly comprise a horizontal movement assembly that moves horizontally with respect to the stationary frame. A vertical movement assembly can be connected to the horizontal movement assembly and provide vertical movement to a cargo platform. As described further herein, cargo can be loaded into the bed of the pickup truck by moving the horizontal movement assembly, with the attached vertical movement assembly and cargo platform, horizontally from the bed of the pickup truck until the cargo platform is clear of the back of the pickup truck. The vertical movement assembly may then lower the cargo platform to the ground where the cargo can be loaded onto it. The vertical movement assembly may then lift the cargo platform and cargo off the ground and once the cargo platform is raised enough, the horizontal movement assembly can move horizontally back to within the bed of the pickup truck. The combined horizontal and vertical movement assemblies allow the independent horizontal and vertical movement of the cargo platform. As such, the cargo platform can be raised vertically and then moved horizontally into the bed of the pickup, while maintaining the cargo platform in a horizontal position.

Figure 2:
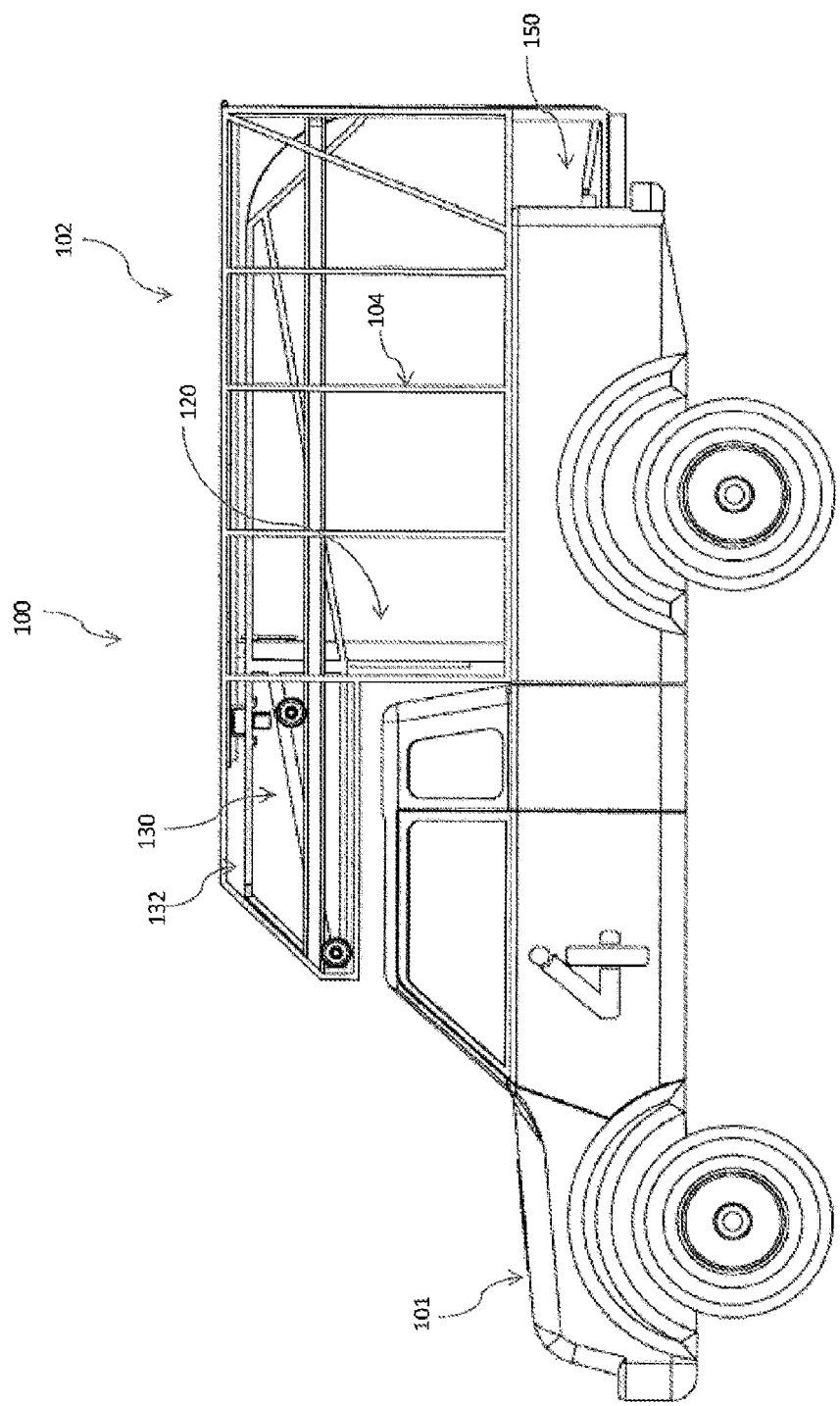
FIG. 2 is a side view of the enclosed lifting system mounted on a bed of a truck with the sheltering skin material removed for clarity.
Figure 3:
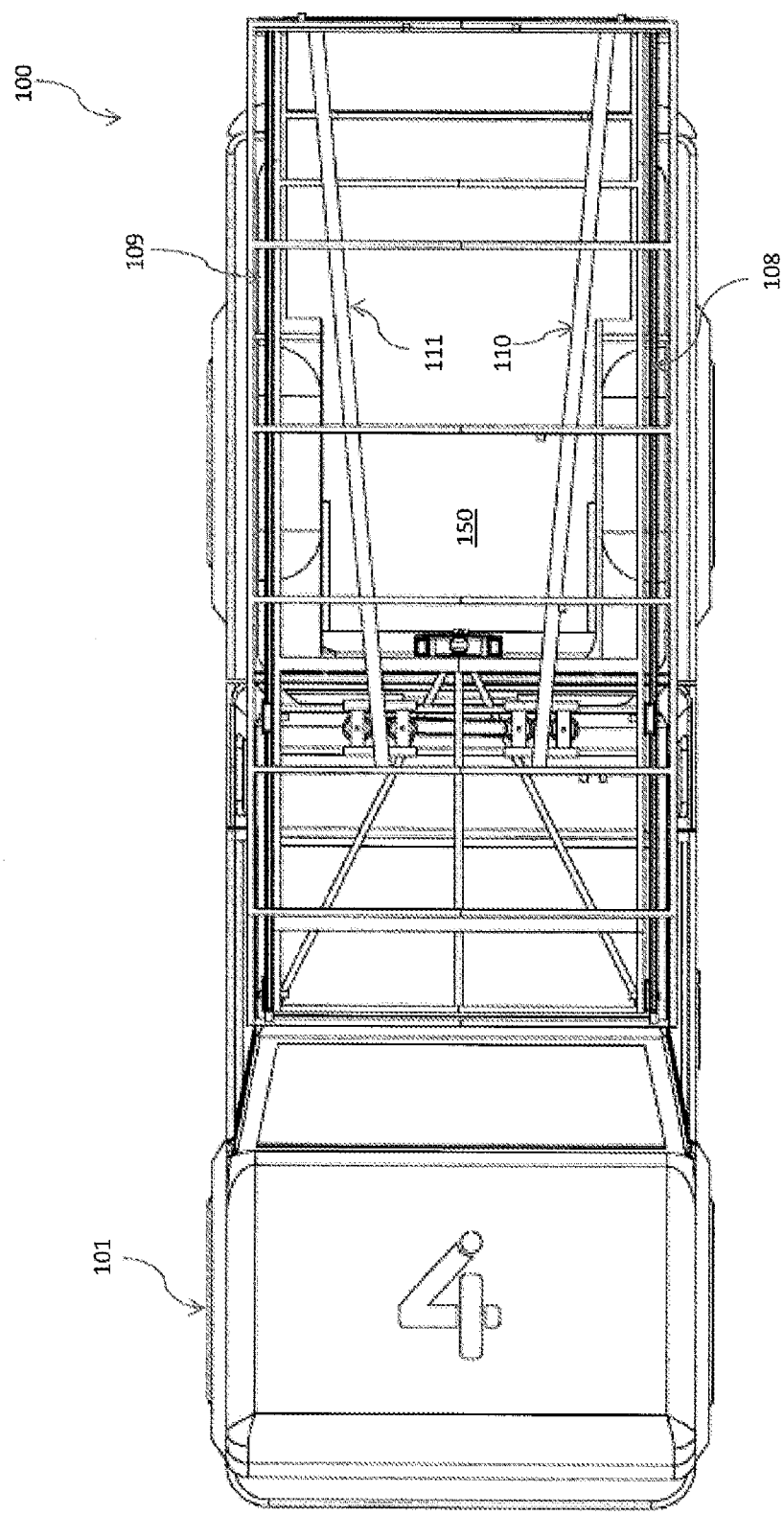
FIG. 3 is a top view of the enclosed lifting system mounted on a bed of a truck with the sheltering skin material removed for clarity.
Figure 4:
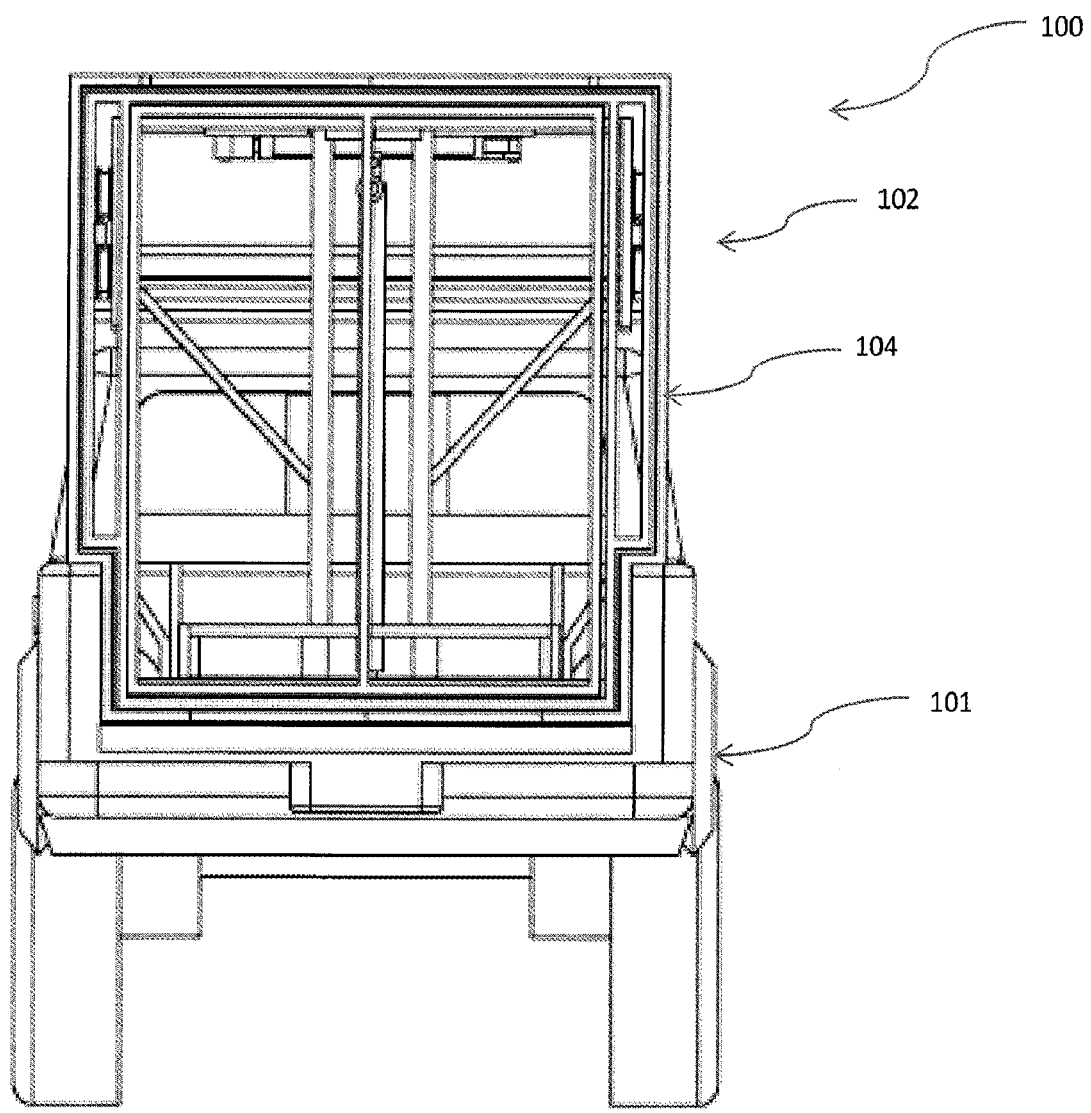
FIG. 4 is a rear view of the enclosed lifting system mounted on a bed of a truck with the sheltering material removed for clarity.
Figure 5:
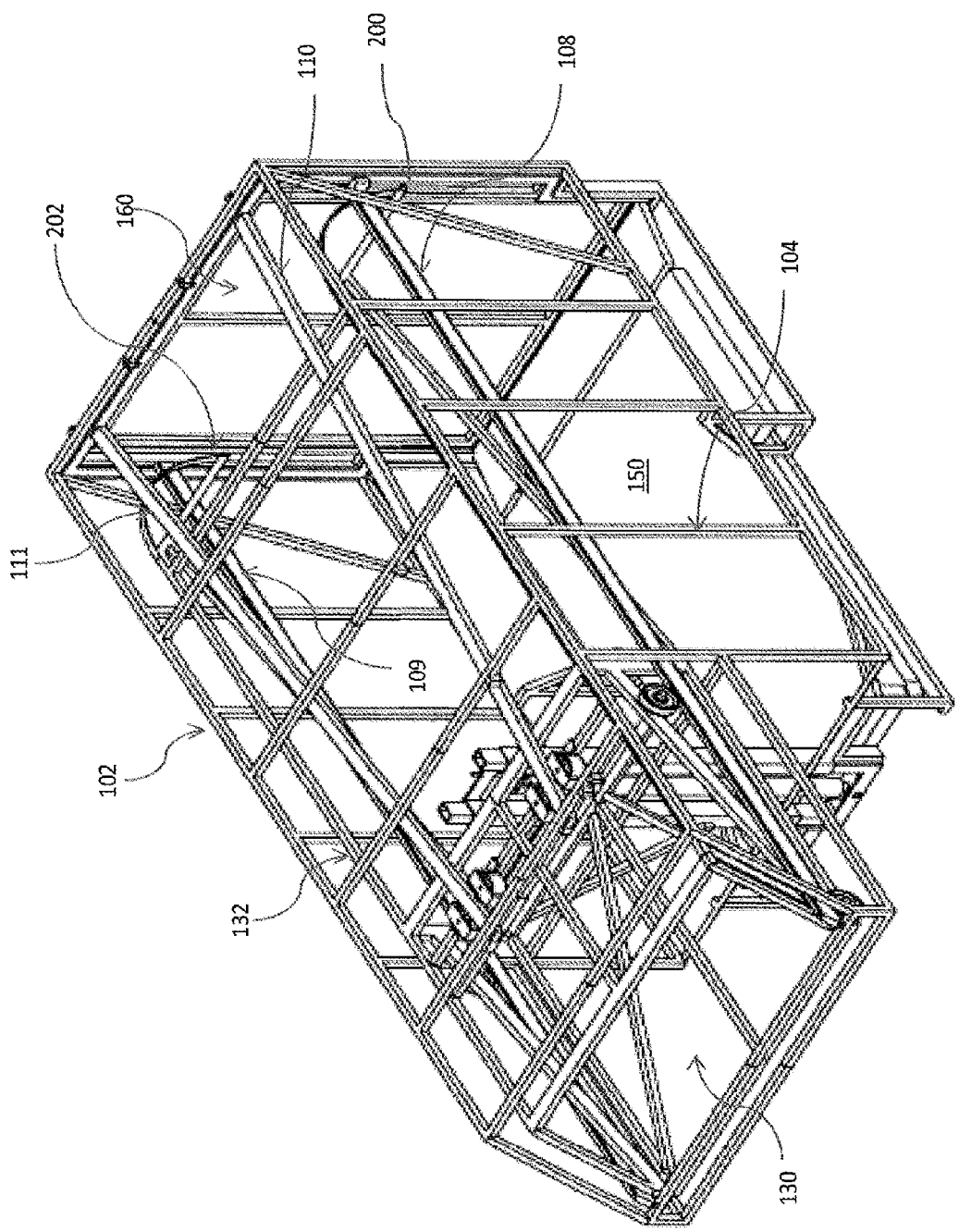
FIG. 5 is an isometric view of the enclosed lifting system with the sheltering skin material removed for clarity.
Figure 9:
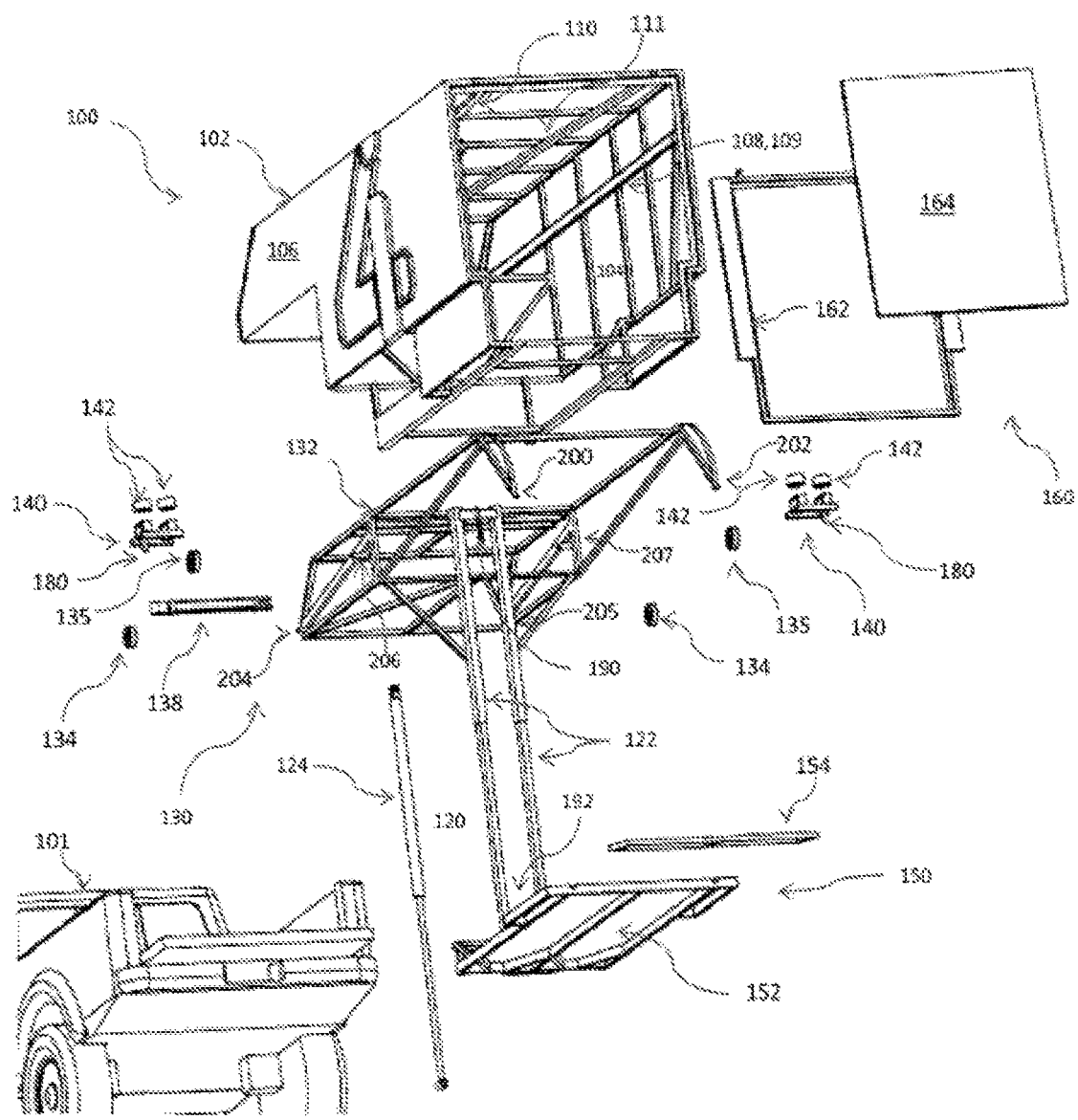
FIG. 9 is an exploded view of the enclosed lifting assembly.

Referring to FIGS. 1-10, an embodiment of a loading and unloading system is described. FIGS. 2-4 depict the loading and unloading system 100 mounted in a vehicle 101 with the skinning panels 106 removed. FIGS. 5-8 depict the loading and unloading system 100 apart from a vehicle with the skinning panels 106 removed. FIG. 9 depicts an exploded view of the components of the loading and unloading system 100.

The loading and unloading system 100 comprises a stationary frame 102 that can be mounted to the bed of a pickup truck mi. The stationary frame 102 may be enclosed by skinning panels 106, which may be made of metal, wood or plastic. The system 100 further comprises a vertical lifting assembly 120, a horizontal movement assembly 130, and a load platform assembly 150.

The stationary frame 102 comprises supporting framework 104 that provides at least first and second side wall frames that are spaced apart from each other to define a cargo space. Each side wall frame provides a support surface that contacts a load-bearing surface of the vehicle in order to support the loading and unloading system. The supporting framework 104 may further comprise one or more upper and lower braces that add strength to the supporting framework 104 and maintain the side wall frames separated. The supporting framework 104 may define an opening at a backend that allows the horizontal movement assembly to move in and out of the cargo space. The stationary frame may include enclosure skin material 106 mounted to the support frame. A primary access door assembly 160 may be mounted to the backend of the supporting framework to close the access opening.

The stationary frame may further comprise left and right horizontal support rails 108, 109 that are substantially identical. The horizontal support rails 108, 109 are mounted substantially parallel to each other on the sides of the side wall frames. The horizontal support rails 108, 109 provide a support surface for the horizontal movement assembly while allowing it to move horizontally. The stationary frame may further comprise left and right converging drive rails 110, 111. The left and right converging drive rails 110, 111 may be mounted to one or more top braces of the supporting frame 102. Although the drive rails 110, 111 converge together, they are substantially coplanar. As described further, below, the converging drive rails 110, 111 may form part of a horizontal drive mechanism that causes the horizontal movement assembly to move horizontally along the support rails 108, 109.

Figure 6:
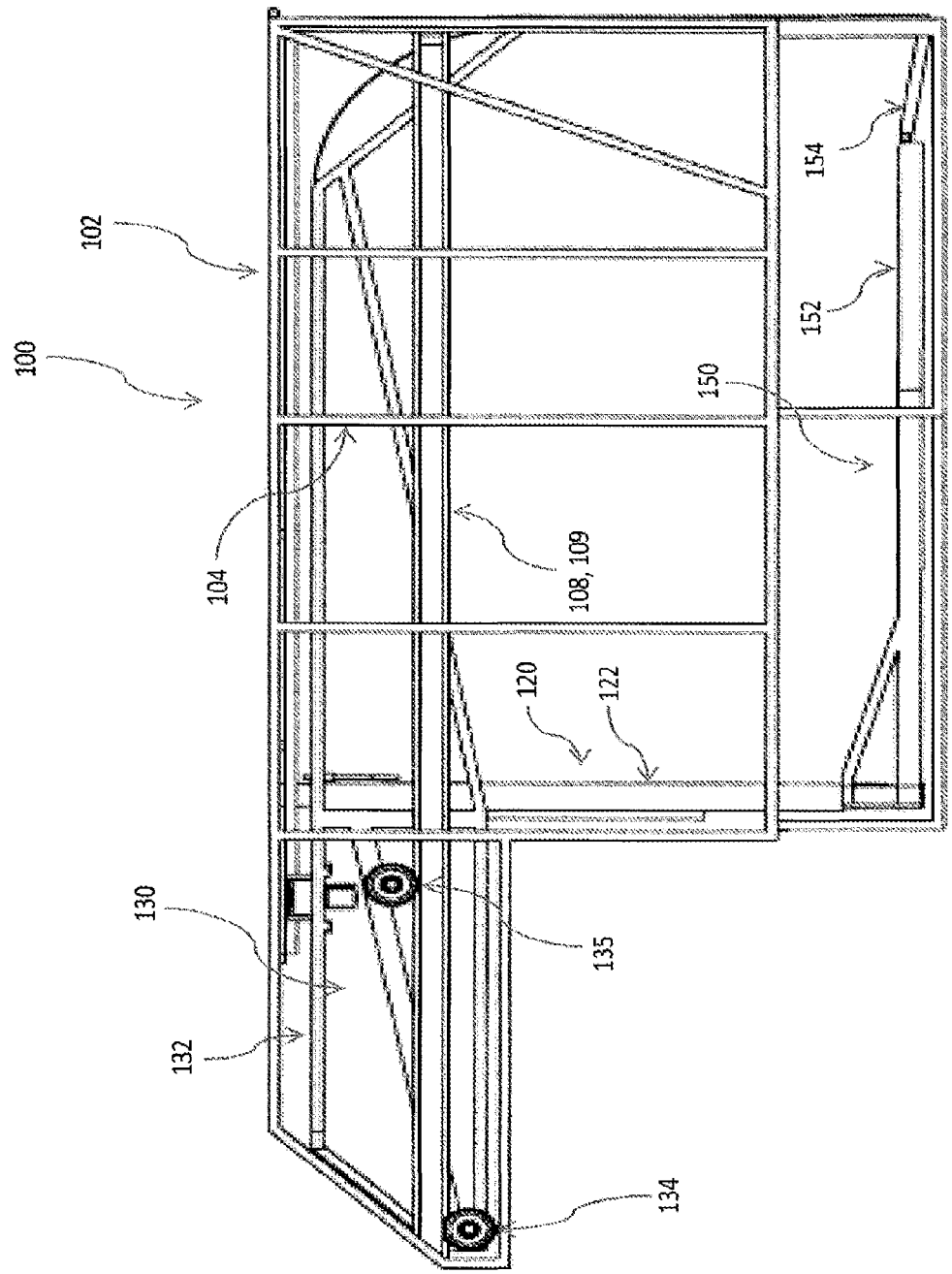
FIG. 6 is a side view of the enclosed lifting system with the sheltering skin material removed for clarity.

The horizontal movement assembly 130 includes a sliding frame 132 for supporting the vertical movement assembly. The horizontal movement assembly further comprises one or more supporting assemblies connected to the sliding frame and contacting the horizontal supporting rails. Each of the supporting assemblies may be securely connected to either side of the sliding frame and may comprise a front support wheel 134, and a rear support wheel 135. As best depicted in FIG. 6, the front wheel support 134 may be mounted to the underside of the supporting rail 108, while the back support wheel 135 may be mounted to the top side of the supporting rail 108. As the sliding frame is extended out the back of the truck bed, the weight of the cargo platform and cargo will exert a rotational force to the sliding frame. Mounting the front and back support wheels 134, 135 on opposite sides of the supporting rail as described limits the ability of the sliding frame to rotate, and as such the vertical movement assembly and the attached cargo platform remain in the same orientation. The front and back support wheels 134, 135 may be securely mounted to the sliding frame 130 by posts, rods or axles 204, 205, 206, 207.

Figure 7:
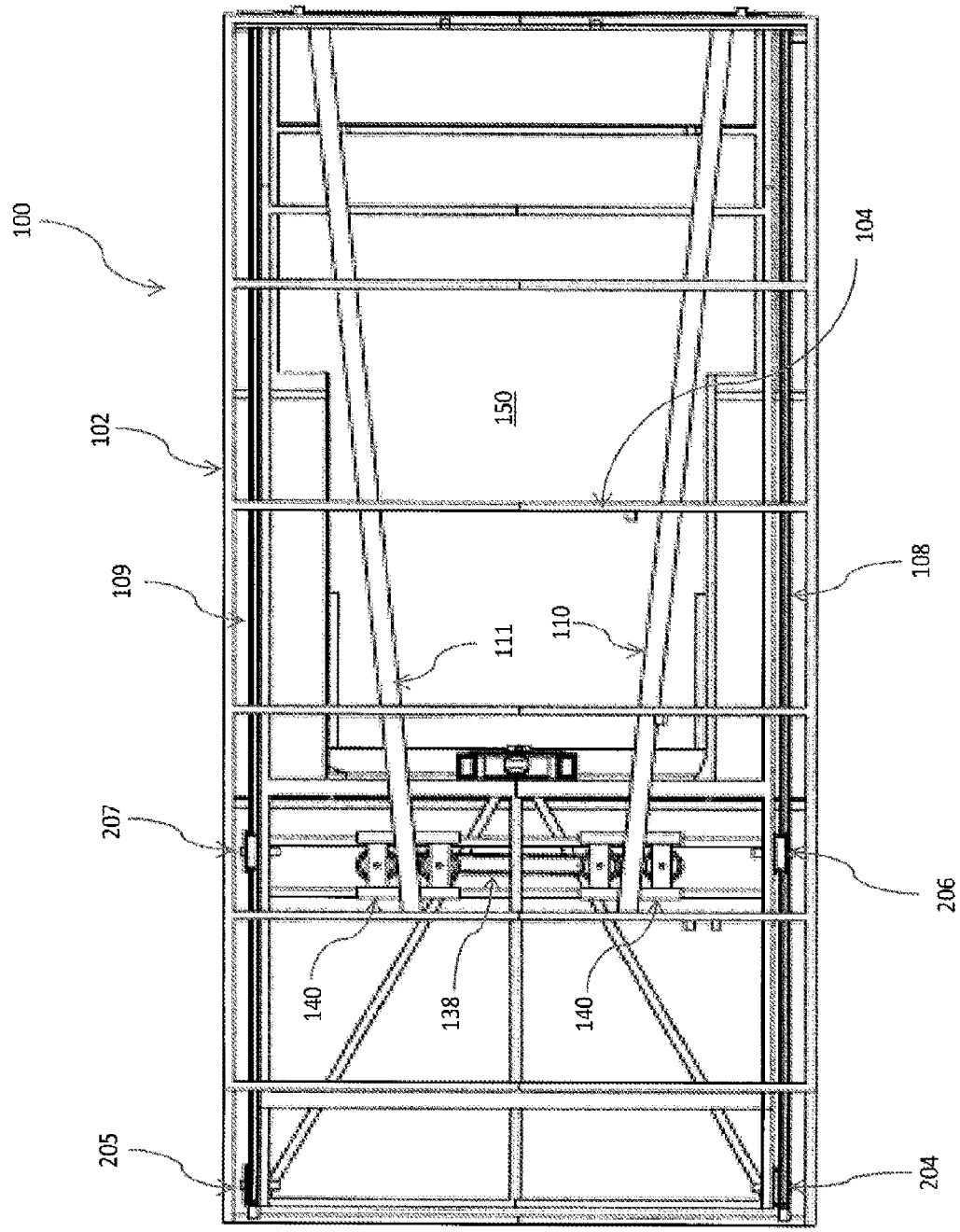
FIG. 7 is a top view of the enclosed lifting system with the sheltering skin material removed for clarity.
Figure 8:
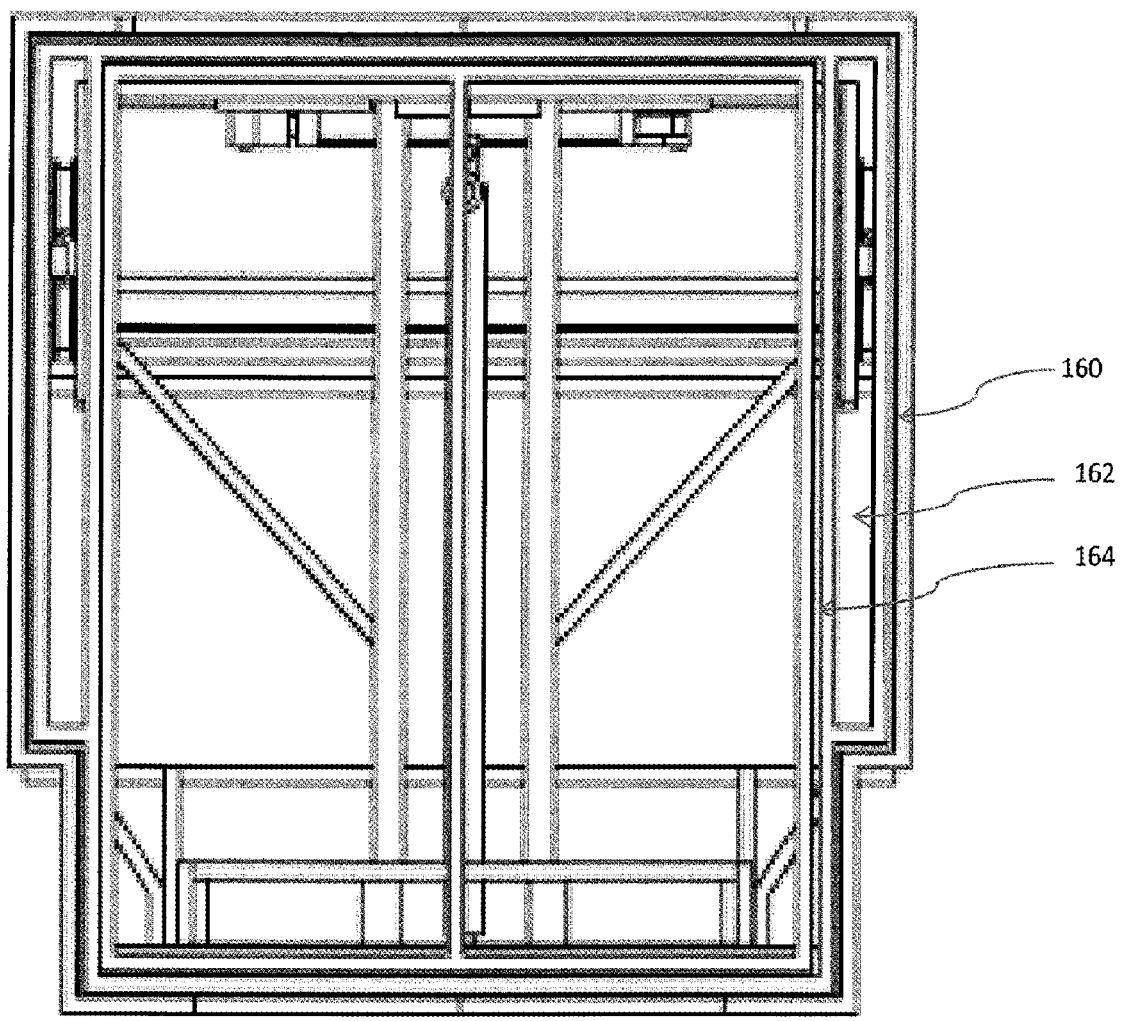
FIG. 8 is a rear view of the enclosed lifting system with the sheltering skin material removed for clarity.

The horizontal movement assembly 130 further comprises two drive assemblies 140 that each comprise a pair of drive rollers 142 that are arranged on either side of one of the converging drive rails 110, 111. The two drive assemblies 140 each have a connection point 180 for connecting the drive assembly to a linear drive mechanism such as a hydraulic cylinder 138. The drive assemblies 140 need to be coupled to the sliding frame such that, they are able to be spread apart and contracted together by the linear drive mechanism. As the drive assemblies are spread apart or contracted together, they move horizontally on converging drive rails 110, 111 and as such need to be securely coupled to the sliding frame in order to move the sliding frame horizontally with the drive assemblies 140. The drive assemblies 140 may be coupled to the sliding frame in various ways. For example, the linear drive mechanism to which the drive assemblies 140 are connected may be securely attached to the sliding frame. Alternatively, the drive assemblies 140 may be slidably attached to sliding frame so that the drive assemblies 140 can slide towards and away from each other on a rail of the sliding frame. As best depicted in FIG. 7, the two drive assemblies may have sections of hollow tube or pipe that captures a pair of slide rails connecting the sides of the sliding frame. As the drive assemblies are driven apart by the linear drive mechanism 138, they move along the converging drive rails 110, 111 and the sliding frame, which is attached to the drive assemblies moves horizontally with them.

The vertical lifting assembly 120 is securely attached to the sliding frame of the horizontal movement assembly 130 so that the vertical lifting assembly moves with the horizontal lifting assembly. The vertical movement assembly 120 may comprise a first elongated member having an end connected to the sliding frame of the horizontal movement assembly and a second elongated member slidably coupled to the first member and having an end that is extendable away from and retractable towards the horizontal movement assembly 130. When the horizontal movement assembly 130 is extended out of the back past the bed of the truck, the second member can be extended to lower an attached cargo platform towards the ground for loading or unloading. Similarly, the second member may be retracted to raise the cargo platform towards the horizontal movement assembly. The first and second elongated members may be provided by a telescopic member 122. Additional telescopic members may be provided to increase the strength of the loading and unloading system. The vertical movement assembly may further comprise a vertical drive mechanism for providing the force to extend and retract the telescopic members 122. The vertical drive mechanism may be provided by a hydraulic cylinder 120 or by other appropriate mechanisms, such as a linear actuator or rotational motor, with gravity acting to lower the cargo platform. Connection points 190 and 192 may couple the vertical drive mechanism 124 to the respective telescoping sections of the telescoping mechanism 122. The lower telescoping section of 122 is attached to the load platform assembly 150.

The load platform assembly 150 may comprise a flat deck 152 that is secured to the bottom end of the vertical movement assembly. The load platform may have an underlying frame providing sufficient support to the platform to allow it to support the cargo. A floor or covering may be secured to the underlying frame in order to provide a flat surface for carrying cargo. A tiltable ramp 154 may be pivotally connected to the rear of the cargo platform to facilitate loading and unloading of cargo, such as wheeled vehicles, onto and off of the cargo platform 152. The cargo platform may have a length such that when the horizontal movement assembly is fully retracted within the support frame 102, the back end of the cargo platform also is within the support frame.

The sliding frame 132 may comprise door bumps that enable the access door assembly 160 to be pushed open during an unloading operation. The access door assembly 160 may be hinged along a top edge so that it is closed by gravity. The door bumps 200, 202 extend from the sliding frame of the horizontal movement assembly 130. The door bumps 200 extend back over the cargo platform so that when the horizontal movement assembly moves rearward, the door bumps 200, 202 will contact the door assembly 160 before the cargo platform. As the horizontal movement assembly continues to move backward, the door assembly 160, which is hinged to swing upward, rides up on the door bumps 200, 202 and rises up. As the horizontal movement assembly is retracted back into the cargo space, the door assembly rides does the door bumps under the force of gravity. Once the horizontal movement assembly 130 is fully retracted, the door closes, and the door bumps 200, 202 may act as latch points that latch the door assembly 160 to maintain a closed position while the system is in the fully loaded configuration.

The access door assembly 160 comprises a main door 162 and a secondary door 164 to enable access without the need raise open the main door 162. The secondary door 164 may be hinged to the main door 162 at the top, sides or bottom. The secondary door 164 may have a manual latching mechanism to latch it in a closed position to the main door 162. The main door 162 or secondary door 164 may include tail lights, signal lights and brake lights for supplementing the existing vehicle lights in the case of partial blocking of the vehicle lights upon the installation of the enclosed lifting system.

The platform assembly 150 is loaded or unloaded into or out of the enclosed support frame 102 via a push button remote control (not shown) using "up" or "down" buttons, or other controls as appropriate. If the vertical drive mechanism and the horizontal drive mechanism 124, 138 are hydraulic cylinders, the remote control controls the hydraulic pump, and appropriate hydraulic valves if appropriate (not shown) that causes the drive mechanisms to retract or extend as desired. The hydraulic pump may be mounted on the horizontal movement assembly 130.

Figure 10:
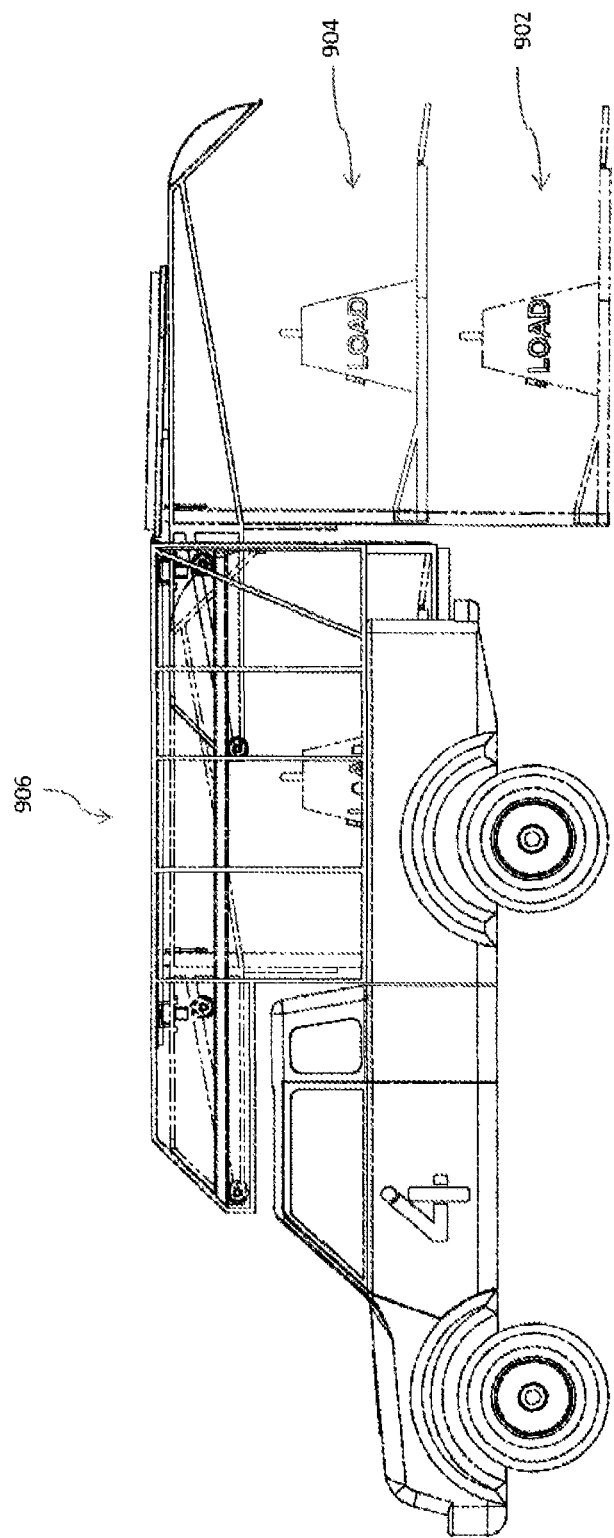
FIG. 10 is a side view of the enclosed lifting system in operation while mounted on the bed of a truck.

FIG. 10 depicts the loading and unloading of the system 100. The operation may begin with the cargo platform lowered to ground level, ready to accept cargo. FIG. 10 depicts this position as 902. When the "up" button is pressed, the platform will initially raise by the retraction of the vertical movement assembly's telescopic member by the hydraulic cylinder 124 until the platform assembly 150 reaches its maximum height. FIG. 10 depicts this position as 904. Limit switches may be used to sequence the vertical and horizontal motion. As the "up" button is continued to be depressed, the platform will commence travelling horizontally into the enclosed stationary frame by the retraction of hydraulic cylinder 138. Hydraulic cylinder 138 controls the positioning of the two sliding assemblies 140 relative to each other. The separation distance of the sliding assemblies 140 determines the position of the horizontal movement assembly 130, and cargo platform 150, along the converging drive rails 110 and 111. As the drive rails 110 and 111 are mounted with converging surface planes, their separation distance along their length is variable. The longitudinal position of the sliding frame 132, load, and platform assembly 150 is established where the separation distance of the sliding mechanisms 140 matches the separation distance along the converging drive rails 110 and 111. Shock absorbers (not shown) may be used to lessen the impact at the end of travel of the horizontal movement assembly 130 for loading and unloading directions. Continuing with the "up" button depressed, the horizontal movement assembly 130, along with the vertical movement assembly 120 and cargo platform, traverse inward into the stationary frame. The access door assembly 160 resting on the door bumps 200, 202 as the door bumps retract into the cargo space. Once the motion into the enclosure has completed the access door assembly 160 is latched in place by the latches of the door bumps 200 and 202. The enclosed lifting system is now in a transport position. FIG. 10 depicts this position as 906.

The above has described one possible implementation of the loading and unloading system. It is contemplated that various modifications may be made to depicted embodiment. For example, although the description and drawings have depicted a particular layout of the frame of the components of the system, it will be appreciated that the described components may be fabricated with different geometries as required to provide a desired strength to the system for a particular application.

Further, additional components may be replaced with other components that provide substantially similar functionality. For example, the horizontal drive mechanism was described with regards to FIGS. 1-9 as being provided by two converging drive rails 110, 111 and adjustable drive assemblies 140. However, it is contemplated that the horizontal drive mechanism could be provided by driving one or more of the support wheels such that the horizontal movement assembly 'drives' along the horizontal support rail.

Figure 11:
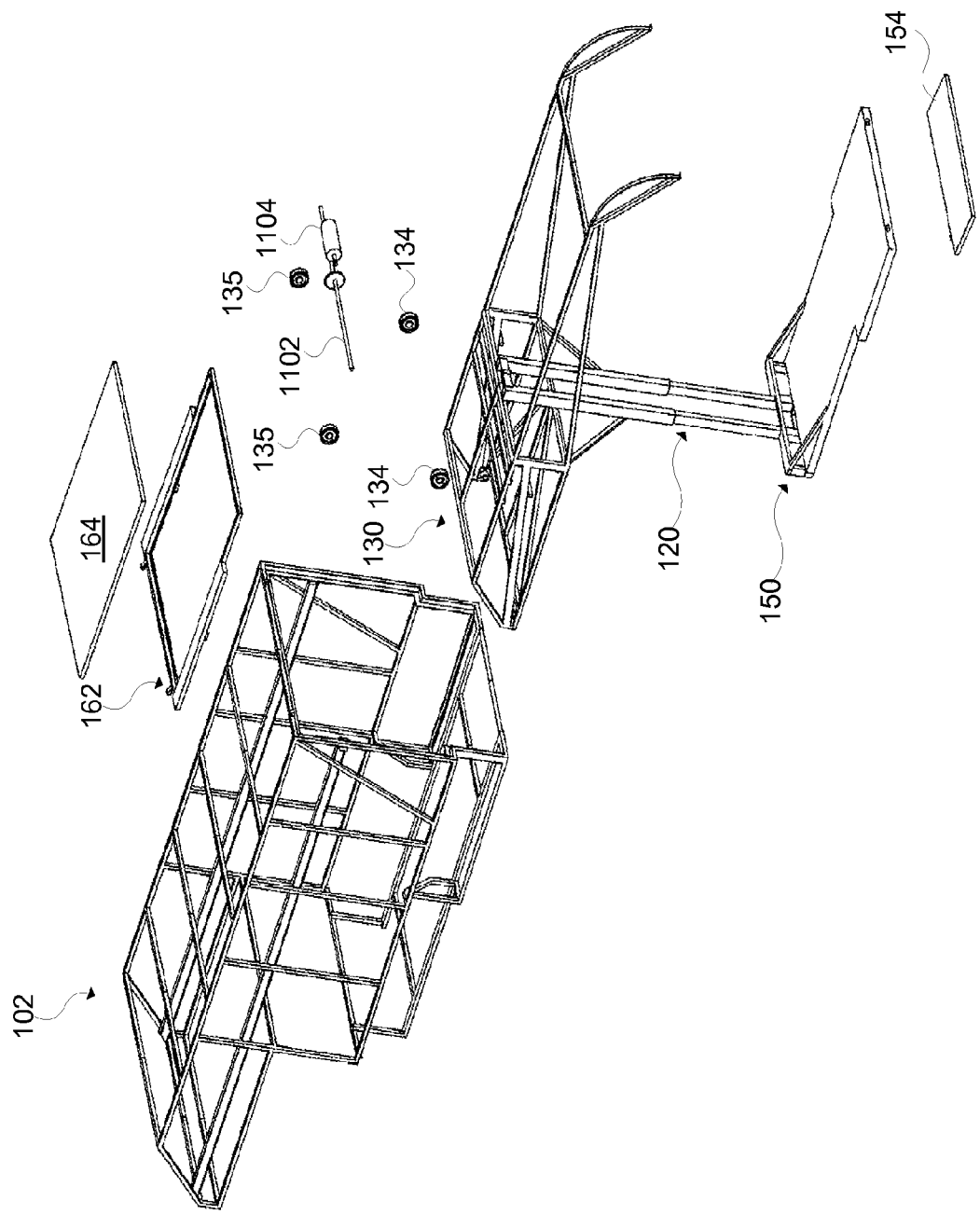
FIG. 11 depicts a loading and unloading system having an alternative horizontal drive mechanism.
Figure 12:
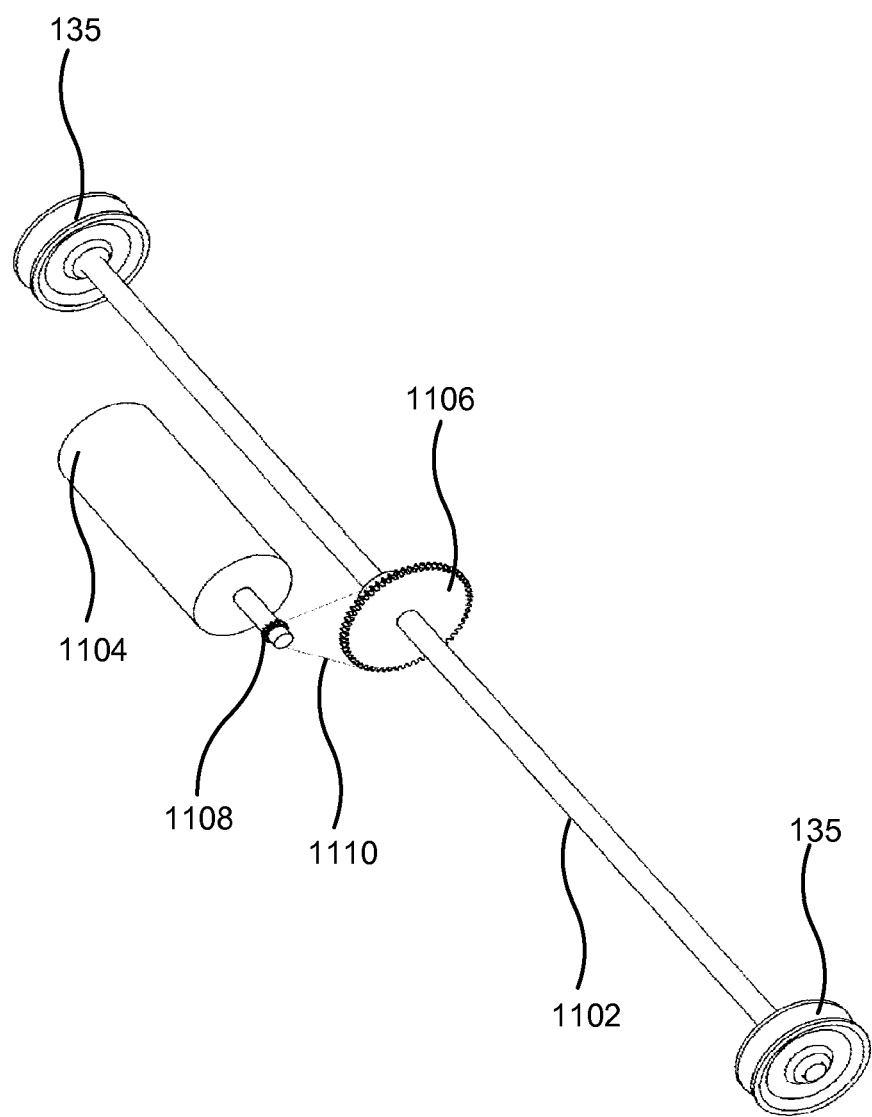
FIG. 12 depicts details of the alternative horizontal drive mechanism of FIG. 11.

FIG. 11 depicts a loading and unloading system having an alternative horizontal drive mechanism. In FIG. 11, the back support wheels 135 are connected to each other by a drive axle 1102. The drive axle may be secured to sliding frame of the horizontal movement assembly, so that the movement of the driven wheels 135 along the horizontal rails will also result in movement of the whole horizontal sliding assembly. A rotary motor 1104 may be attached to the sliding frame and used to rotate the drive axle 1102 in the appropriate direction. The drive wheels 135, axel 1102 and rotary motor 1104 are depicted in detail in FIG. 12. As depicted, the axle 1102 may be solidly connected to the hubs of the drive wheels 135 so that rotation of the axle results in a corresponding rotation of the drive wheels 135. Similarly a sprocket 1106 may be solidly attached to the drive axle 1102 and connected to a sprocket 1108 on the rotary motor 1104 by a chain or belt 1110. The remaining components of the system are substantially similar as described above and as such will not be described in further detail; however, it is noted that the converging drive rails 110, 111 and drive assemblies 140 are not required with the alternate horizontal drive assembly described.

Other modifications than those described above may be made. For example, the above has depicted two horizontal supporting rails that are mounted on respective side wall frames of the stationary frame. It is contemplated that the horizontal supporting rails could be mounted to connecting braces on the top of the stationary frame. Further still a single horizontal supporting rail could be provided, or three or more horizontal supporting rails could be provided. It should be appreciated that the specific structure and geometry of the system as well as the materials for its fabrication may be selected based on a desired strength of the loading and unloading system.

Further to the implementations and modifications described above, it is possible to provide further additional features to the loading and unloading system described above. For example, the loading and unloading system may be fitted with a plurality, preferably four, jack stands. The jack stands may be similar to those commonly found on trailers or campers that can rotate downwards, or otherwise move between a stored position and a jack position. The jack stands can be used to slowly jack the loading and unloading system up off of the truck bed, or similarly down on to the truck bed. Although the permanently affixed jack stands work well, they have some drawbacks. For example the permanently affixed jack stands may obscure the view when driving, reduce the aerodynamics of the vehicle, as well as possibly reduce the aesthetics of the vehicle. Further, since the jack stands are permanently affixed to the loading and unloading system, they have a relatively narrow stance when in use, making it difficult to drive the truck out from between the jacks.

Figure 13:
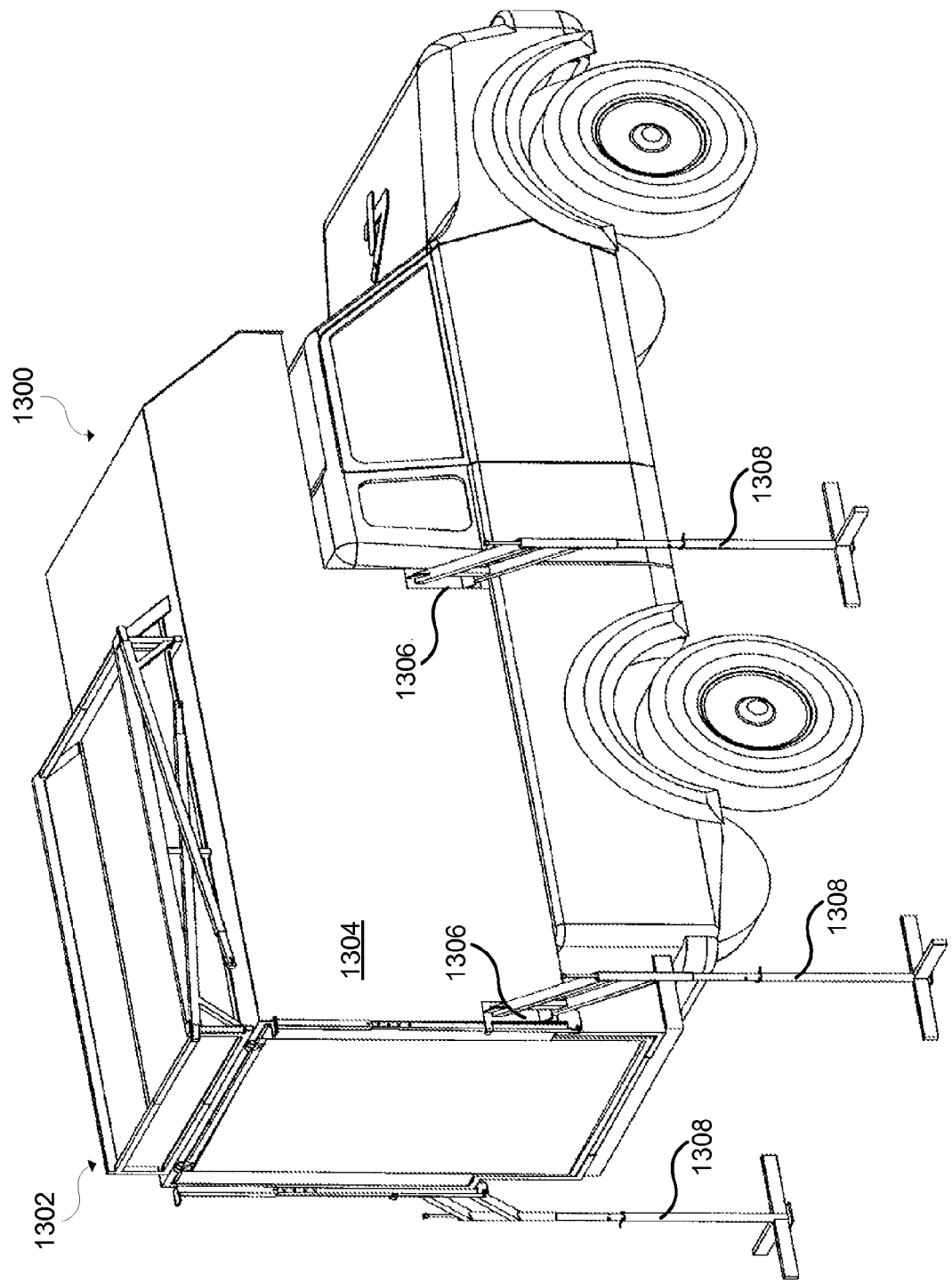
FIG. 13 depicts a loading and unloading system mounted to the truck and provided with secondary support surfaces.

FIG. 13 depicts the loading and unloading system mounted to the truck and provided with secondary support surfaces that are used as mounting points for removable jack stands. The loading and unloading system 1300 is substantially similar to that described above, and as such, will not be described in detail herein. The loading and unloading system 1300 is depicted as having a cargo box 1302 on the top of the stationary frame. As depicted, the stationary frame 1304 has four secondary support surfaces 1306 mounted at the approximate corners. A removable jack stand 1308 is attached to each of the secondary support surfaces 1306 and can be slowly raised or lowered to attach or remove the loading and unloading system 1300. Since the jack stands can be removed when in transport, they can be provided with a wider stance without concern of obstructing visibility or increasing the size of the transport vehicle. Once the jack stands are raised, the truck can be driven out from under the system 1300, and since the jack stands 1308 have a wide stance, it requires less precision to drive the truck out.

Figure 14:
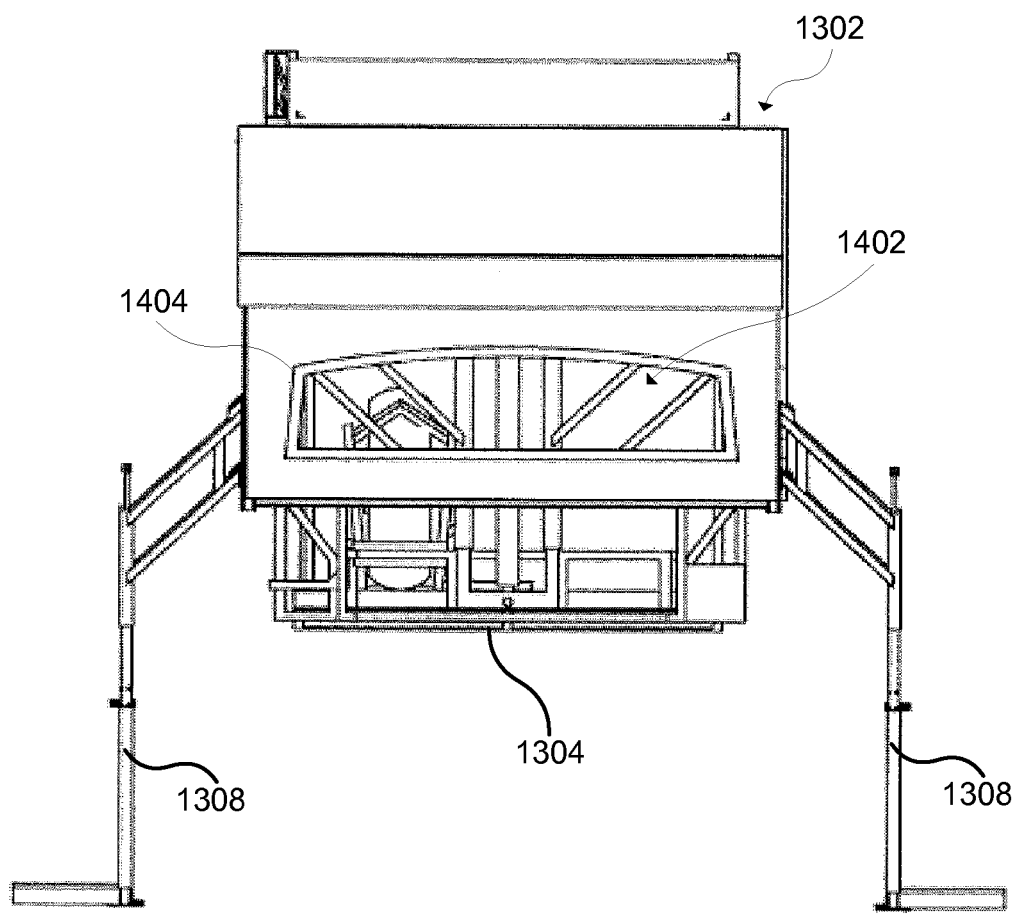
FIG. 14 depicts the loading and unloading system of FIG. 13 supported by jack stands.

FIG. 14 depicts the loading and unloading system 1300 supported by the jack stands 1308a,b,c,d. As can be seen, each jack stand extends out away from the stationary frame to provide a wide stance. Once the truck is driven out, the jack stands remain to support the loading and unloading system.

Further visible in FIG. 14 is a portal 1402 in the skinning on the front of the stationary frame. The portal 1402 may comprise a surrounding cowling 1404 to press against and form a seal to a window or opening in the cab of the truck. The portal can provide an opening or access way that allows air, sound and/or wiring to pass from the cab of the truck to the cargo space.

Figure 15:
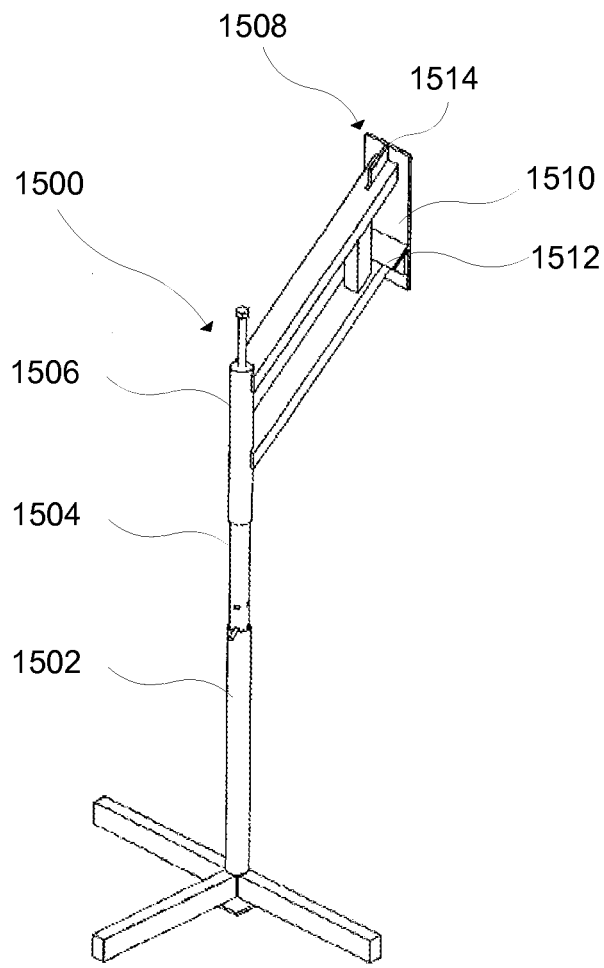
FIG. 15 depicts a removable jack stand.

FIG. 15 depicts a removable jack stand. The removable jack stand 1500 may be used as one of the removable jack stands 1308. The removable jack stand 1500 comprises a base 1502, an extension tube 1504 and a jack top 1506. A secondary support 1508 is permanently mounted to the stationary frame. The secondary support comprises a mounting plate 1510 that can be secured to the stationary frame, a support surface 1512 for contacting the jack top 1506 and an alignment member 1514 for maintaining the relative alignment of the jack top 1506 and the support surface 1512.

The base 1502 may have a broad ground interaction either with a wide platform or extending legs as depicted to give the jack stands stability. The base 1502 further comprises tubular vertical hollow section that telescopes with a smaller tubular extension component in the vertical direction. These tubular components can be square, rectangular, or round in its cross sectional shape.

The extension tube 1504 may telescope with the base 1502 to allow for a rough height adjustment of the jack stand. The height is maintained and adjusted with a horizontal pin securing the extension tube 1504 within the base tube through the appropriately chosen horizontal cross-hole.

The jack top 1506 comprises of framework that can extend toward the stationary frame and interact with the support surface 1512 of the secondary support. As depicted, a lower portion of the extending framework may contact the support surface of the secondary support 1508 and an upper portion of the framework may interact with the alignment member 1514 to prevent any rotation or movement between the interacting surfaces of the jacktop and the support surface 1512. The jack top also comprises a threaded hole and a threaded rod feature that allows for high linear force to be applied by rotating the rod within the threaded hole to provide gradual movement to lift or lower the loading system in a slow careful manner.

Figure 16:
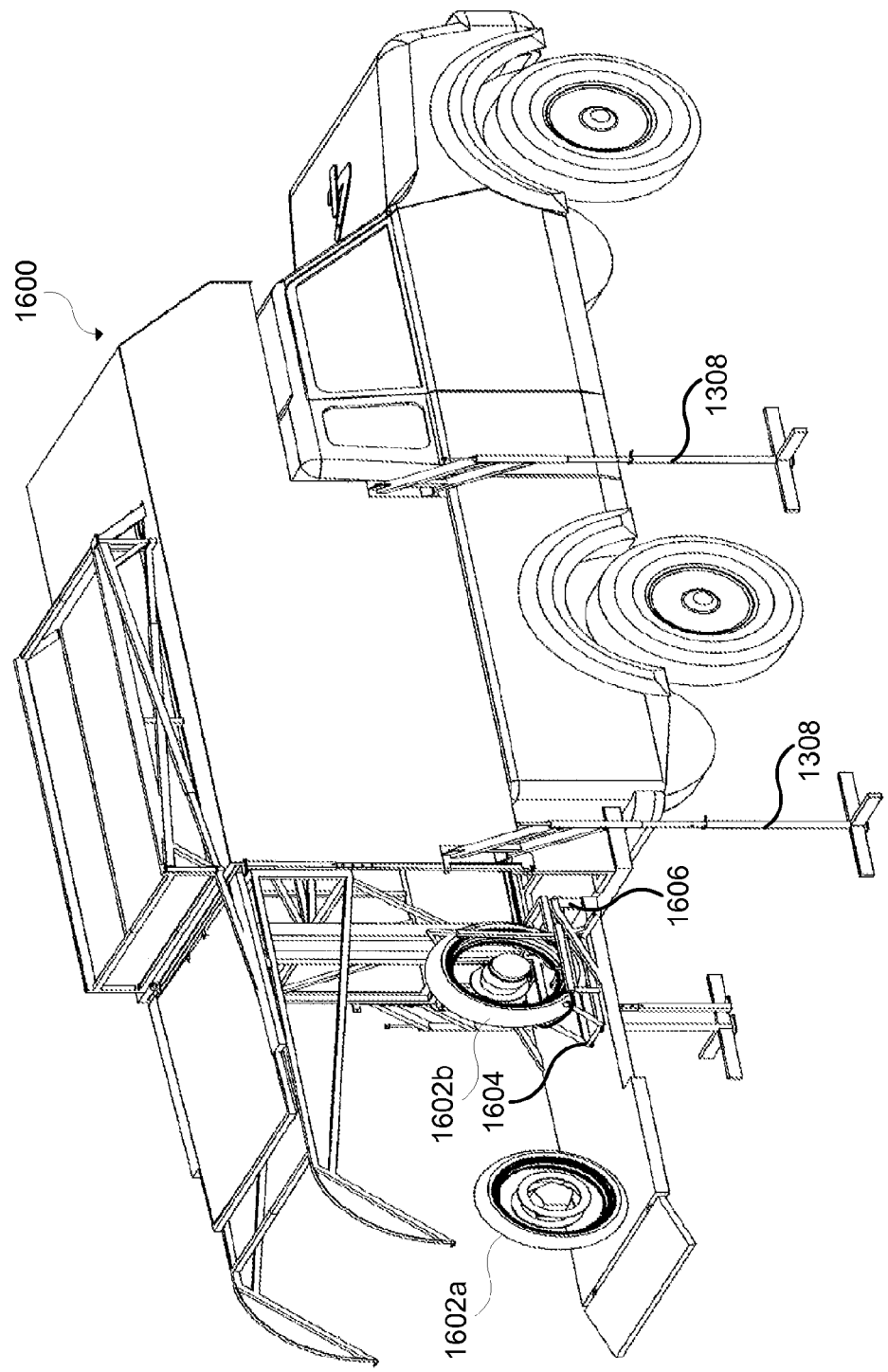
FIG. 16 depicts a loading and unloading system with a wheel chock.

FIG. 16 depicts a further feature of a loading and unloading system. The loading and unloading system 1600 is depicted as being used to transport a motorcycle, depicted by two wheels 1602a,b for convenience. The loading system 1600 may comprise a wheel chock 1604 clamped to a back frame 1606 of the cargo platform. The wheel chock 1604 receives a motorcycle wheel and holds the wheel, and so the motorcycle vertically. The wheel chock 1604 provides a compact means for securing a motorcycle to the cargo platform, as such, it is possible to provide two wheel chocks on the cargo platform to transport or store two motorcycles.

Figure 17:
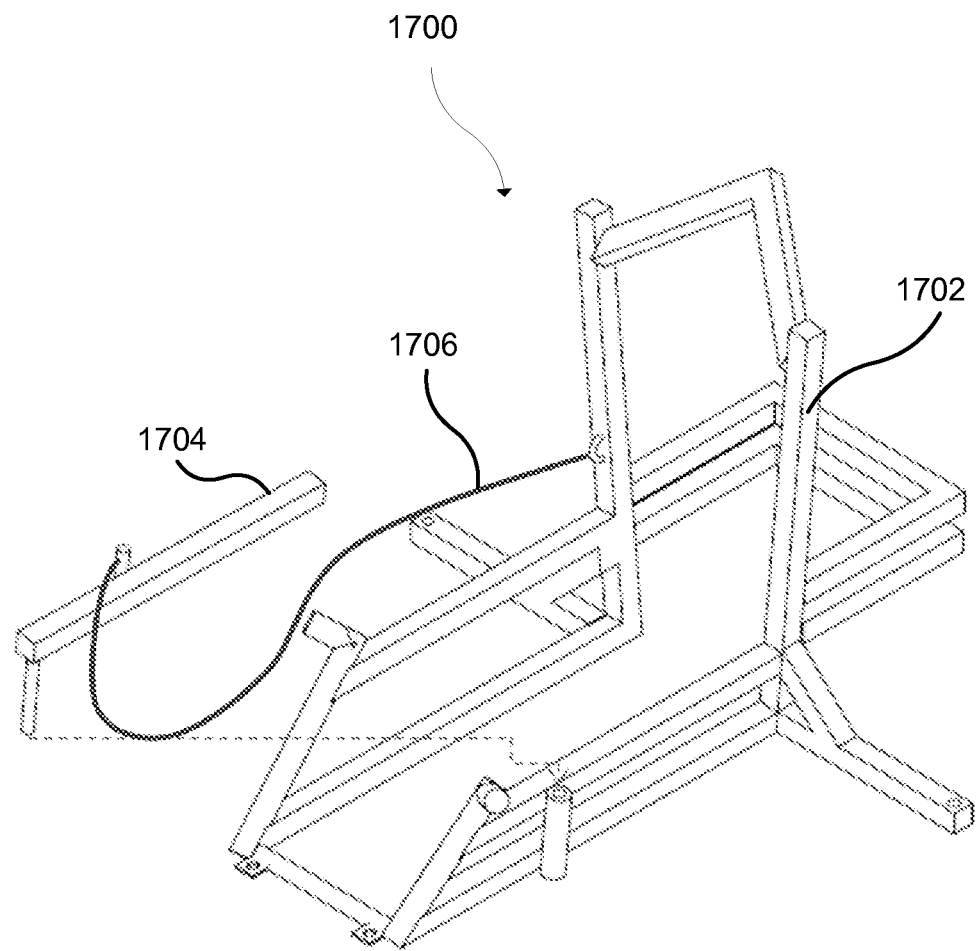
FIG. 17 depicts details of a wheel chock.
Figure 18:
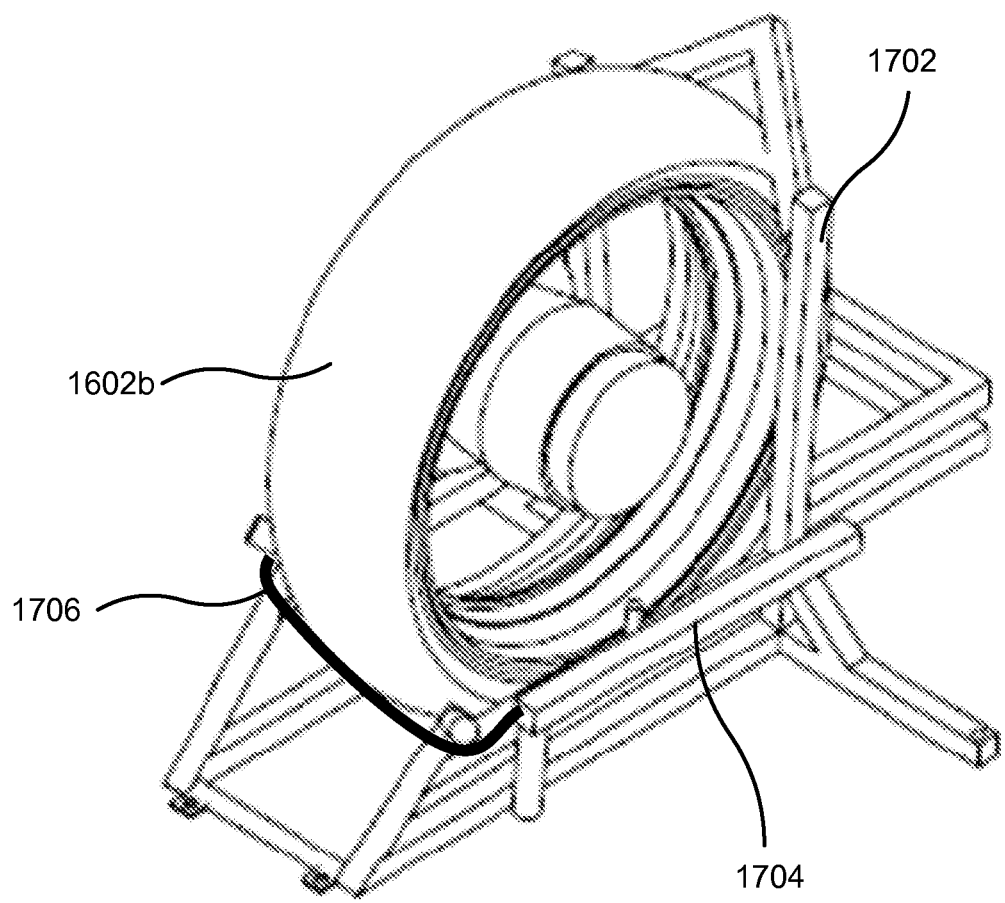
FIG. 18 depicts the wheel chock of FIG. 17 with a wheel secured to it.

FIG. 17 depicts a wheel chock. FIG. 18 depicts the wheel chock with a wheel secured to it. The wheel chock 1700 may be used as wheel chock 1604 described above. The wheel chock consists of three main components, namely a wheel chock body 1702, a clamping lever 1704 and a clamping chain or cable 1706.

The wheel chock body 1702 is a framework that has two sides that envelope the rear wheel of the motorcycle. The rear cross-sectional profile of the rear tire is wedged into a VEE in the upper rear area of the framework. The lower portion of the wheel is also surrounded by the two sides of the framework. A locking arm or clamping lever 1704 is located on one or two sides of the framework to control tension on a locking band that may be provided by a chain or cable 1706 to lock or unlock the wheel from the wheel chock. The clamping lever 1704 may have a rod or pin that fits into a respective hole in the framework. Rotating the clamping lever 1704 about the rod or pin tightens or loosens the clamping chain or cable 1706. When the clamping lever 1704 is operated in the tighten direction, the chain tension increases until it reaches a maximum tension when the clamping lever is in-line with the chain's pull direction, that is the chain is on center with the lever. When the lever is operated beyond this center point to a dead stop location, slightly off center of the lever/chain, the chain tension locks the lever in this "tension on" position. This maintained tension on the chain or cable is also applied across the front section of the tire to the other side of the framework on the other side of the wheel. The chain bearing on the wheel pushes the wheel harder into the VEE in the upper rear area of the framework. On each side of the wheel, the chain is guided into its clamping orientation by the sloping nature of the front of the framework, and hooked into a cleat at the higher end of the sloped section of the framework.

The contact points and/or areas of the wheel chock body with the wheel are the upper rear of the tire, and the lower front of the tire. An imaginary straight line between this two areas pass across the diameter of the wheel, slightly above the axle location of the rear wheel. This "above center" alignment of the contact areas with the axle create a "locked in" situation where the wheel is trapped.

When the clamping lever is operated to release the tension, the chain is slackened and slides down the sloped area of the framework so that the chain reaches the bed of the trailer or truck. The chain is low enough for the wheel to now roll over it to free the motorcycle while unloading.

While loading the motorcycle, the sloped feature of the framework also helps guide the wheel into location as a funneling effect. The left and right side structures of the framework may also be slightly angled (wider at the top, narrower at the bottom) so that the motorcycle does not have to be exactly vertical while loading.

The chain or cable can be supplied with a turn-buckle to provide a means of adjusting the amount of clamping tension.

The framework may be asymmetrical, and can accommodate clearance required for the rear sprocket and brake disc located around the axle area of the motorcycle wheel depending on the type of motorcycle being secured.

Although described as being used for a back wheel of a motorcycle, the same design can be adapted to the front wheel of the motorcycle even though this design is depicted using the rear. As this is depicted using a motorcycle wheel, its principals and concepts can be used for securing any wheel regardless of its application. For example, he wheel chock may be used to secure wheels of an ATV, a side by side, golf cart etc.

Various embodiments of a loading and unloading system have been described. Additional features, advantages, and modifications will be apparent to one skilled in the art having read the current description.

What is claimed is:

1. A vehicle mounted loading and unloading system comprising:
    a stationary frame comprising:
        first and second side wall frames spaced apart from each other to define a cargo space, each side wall frame comprising at least one support surface for contacting a load-bearing surface of a vehicle when the loading and unloading system is mounted to the vehicle;
        a horizontal support rail; and
        two horizontal drive rails located along a top of the stationary frame at a converging angle relative to each other;
    a horizontal movement assembly comprising:
        a sliding frame sized to fit between the first and second side wall frames;
        a supporting assembly connected to the sliding frame, the supporting assembly contacting the horizontal support rail to support the sliding frame and allow horizontal movement of the sliding frame;
        two drive assemblies each of the drive assemblies comprising two rollers arranged on opposite sides of a respective one of the horizontal drive rails; and
        a linear drive mechanism connected between the two drive assemblies and attached to the sliding frame of the horizontal movement assembly, the linear drive mechanism capable of changing the distance between the two drive assemblies causing the two drive assemblies to change position along the two converging horizontal drive rails, thereby causing a horizontal movement of the horizontal movement assembly;
    a vertical movement assembly comprising:
        a first member having a first end connected to the sliding frame of the horizontal movement assembly; and
        a second member slidably coupled to the first member and having a second end extendable away from and retractable towards the first end of the first member in a vertical direction; and
    a cargo platform connected to the second end of the second member.

2. The system of claim 1, wherein the stationary frame is made from metal tubing and further comprises:
    a top comprising at least one upper support brace connecting a top of the first side wall frame to a top of the second side wall frame; and
    a bottom comprising at least one lower support brace connecting a bottom of the first side wall frame to a bottom of the second side wall frame.

3. The system of claim 2, wherein the stationary frame further comprises a plurality of exterior skins coupled to the metal tubing enclosing the cargo space.

4. The system of claim 3, wherein at least one of the plurality of exterior skins comprises a sealable portal.

5. The system of claim 1, wherein the first member of the vertical movement assembly comprises metal tubing and wherein the second member of the vertical movement assembly comprises a metal member received within an interior portion of the metal tubing.

6. The system of claim 5, further comprising a vertical drive mechanism capable of extending and retracting the vertical movement assembly, wherein the vertical drive assembly comprises at least one of:
    a linear actuator;
    a hydraulic cylinder; or
    a rotational motor and gravity.

7. The system of claim 1, wherein the stationary frame defines a rear opening through which the horizontal movement assembly, the vertical movement assembly and the cargo platform can pass, the system further comprising:

a primary door hingedly connected to the stationary frame over the rear opening.

8. The system of claim 7, wherein the horizontal movement assembly further comprises a door bump extending from the sliding frame over the cargo platform, the door bump causing the primary door to open before the cargo platform contacts the primary door when the horizontal movement assembly moves towards the primary door.

9. The system of claim 7, wherein the primary door comprises a secondary door hingedly connected to the primary door to allow access to the cargo space when the primary door is closed.

10. The system of claim 1, wherein the cargo platform provides a horizontal surface for supporting cargo and remains substantially horizontal during loading and unloading of cargo.

11. The system of claim 10, wherein the cargo platform further comprises a loading ramp hingedly connected to the cargo platform at a loading end to facilitate loading of cargo onto the cargo platform.

12. The system of claim 10, wherein the cargo platform further comprises at least one wheel chock secured to an end of the cargo platform opposite the loading end, the at least one wheel chock providing a frame for receiving a motorcycle wheel to maintain the motorcycle in a vertical position on the cargo platform.

13. The system of claim 1, comprising fasteners for releasably securing the system to the at least one load-bearing surface of the vehicle.

14. The system of claim 1, further comprising at least four secondary supports located at respective external corners of stationary frame for receiving adjustable jack stands and supporting the system to allow the vehicle to be driven out from underneath, each of the secondary supports comprising:

a mounting plate securely attached to the stationary frame;

a support surface securely attached to the mounting plate for contacting a load-bearing surface of a respective adjustable jack stand; and an alignment surface for maintaining contact between the support surface and the load-bearing surface of the respective jack stand.

15. The system of claim 1, further comprising:

a vertical drive mechanism capable of extending the vertical movement assembly to lower the cargo platform to a loading position in which the cargo platform is adjacent to a loading surface and retracting the vertical movement assembly to raise the cargo platform to a transport position in which the cargo platform can be retracted into the cargo space; and a control remotely located from the horizontal drive mechanism and the vertical drive mechanism capable of controlling operation of the horizontal drive mechanism and the vertical drive mechanism.

* * * * *